US011243799B2

(12) United States Patent
Ashkar et al.

(10) Patent No.: US 11,243,799 B2
(45) Date of Patent: Feb. 8, 2022

(54) ADAPTIVE WORLD SWITCHING

(71) Applicant: ADVANCED MICRO DEVICES, INC., Santa Clara, CA (US)

(72) Inventors: Alexander Fuad Ashkar, Orlando, FL (US); Hans Fernlund, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 193 days.

(21) Appl. No.: 16/556,521

(22) Filed: Aug. 30, 2019

(65) Prior Publication Data

US 2021/0064405 A1 Mar. 4, 2021

(51) Int. Cl.
*G06F 9/455* (2018.01)
*G06F 9/38* (2018.01)

(52) U.S. Cl.
CPC ........ *G06F 9/45558* (2013.01); *G06F 9/3877* (2013.01); *G06F 2009/4557* (2013.01); *G06F 2009/45579* (2013.01); *G06F 2009/45595* (2013.01)

(58) Field of Classification Search
CPC .............. G06F 9/45558; G06F 9/3877; G06F 2009/4557; G06F 2009/45579; G06F 2009/45595
See application file for complete search history.

(56) References Cited

U.S. PATENT DOCUMENTS

| 8,612,975 | B2 | 12/2013 | Serebrin et al. | |
|---|---|---|---|---|
| 9,652,272 | B2 * | 5/2017 | Kruglick | G06F 9/45533 |
| 2008/0276235 | A1 * | 11/2008 | Knauerhase | G06F 9/4881 718/1 |
| 2013/0007322 | A1 * | 1/2013 | Arges | G06F 9/5077 710/200 |
| 2019/0004839 | A1 * | 1/2019 | Cheng | G06F 9/45558 |

* cited by examiner

*Primary Examiner* — Jacob D Dascomb

(57) ABSTRACT

An apparatus includes a plurality of virtual machines, a hypervisor coupled to the plurality of virtual machines, and a graphical processing unit (GPU) coupled to the hypervisor. The plurality of virtual machines are allocated a plurality of time slices. The hypervisor initiates a world switch to a first virtual machine of the plurality of virtual machines. The GPU makes a determination as to whether to adjust the time slice associated with the first virtual machine based on an assessment of time slice adjustment parameters related to an execution time of at least one of the plurality of virtual machines.

20 Claims, 3 Drawing Sheets

ADAPTIVE WORLD SWITCHING

BACKGROUND

Modern computer systems utilize virtualization to allow the sharing of physical resources of a host system between different virtual machines (VMs) or guests. VMs are software abstractions of physical computing resources that emulate an independent computer system, thereby allowing multiple operating system environments to exist simultaneously on the same computer system. The host system allocates a certain amount of its physical resources to each of the VMs so that each guest is able to use the allocated resources to execute applications, including operating systems (referred to as "guest operating systems"). The guests are managed by a virtual machine manager (VMM), which is also known as a hypervisor. A switch between virtual machines (in either direction) is often referred to as a "world switch". A delay in the amount of time the computer system takes to switch between the guest and the VMM can result in a negative quality of service (QoS) experience for the user of the computer system.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
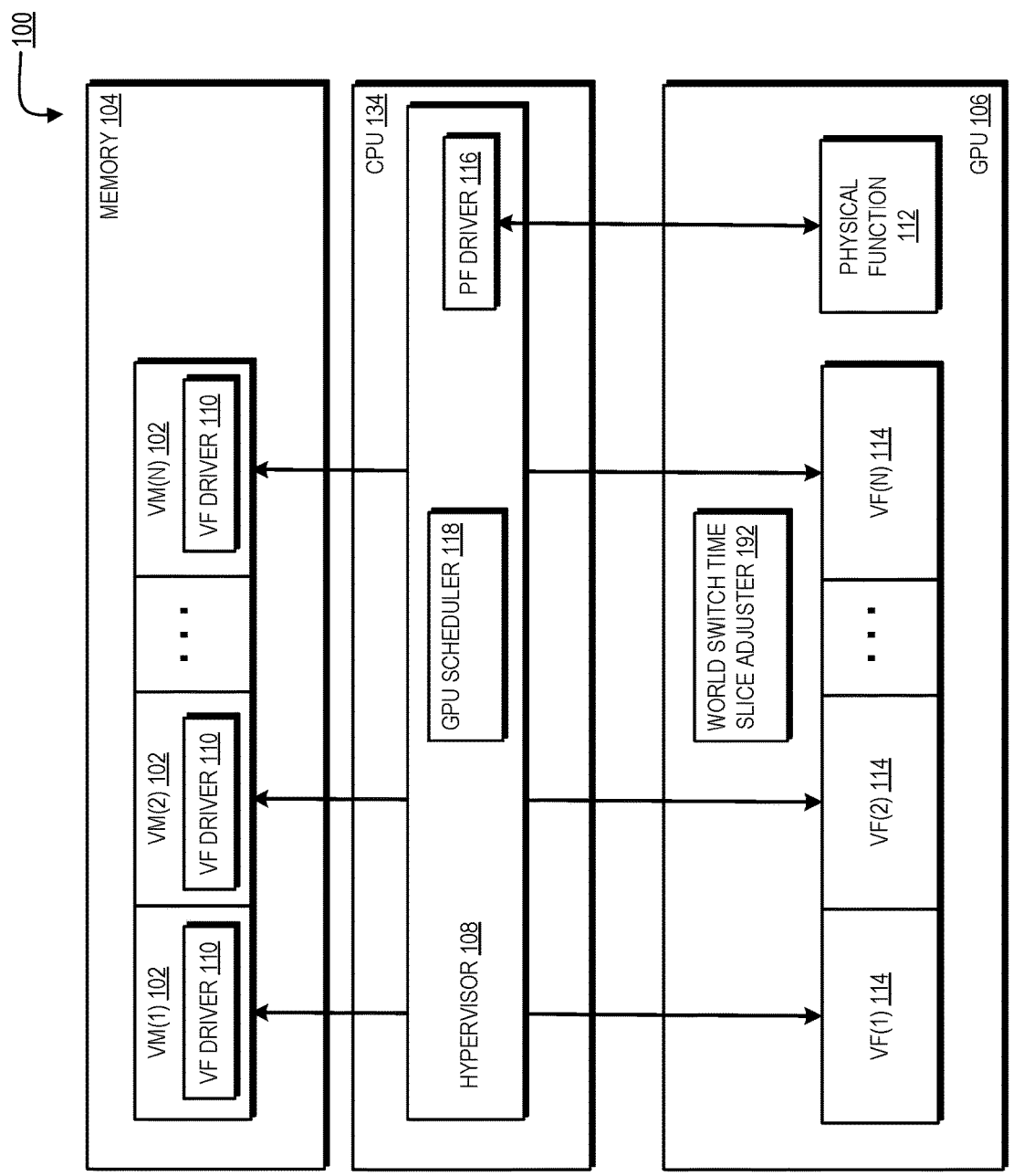
FIG. 1 is a block diagram of a system for hosting virtual machines and virtual functions in accordance with some embodiments.
Figure 2:
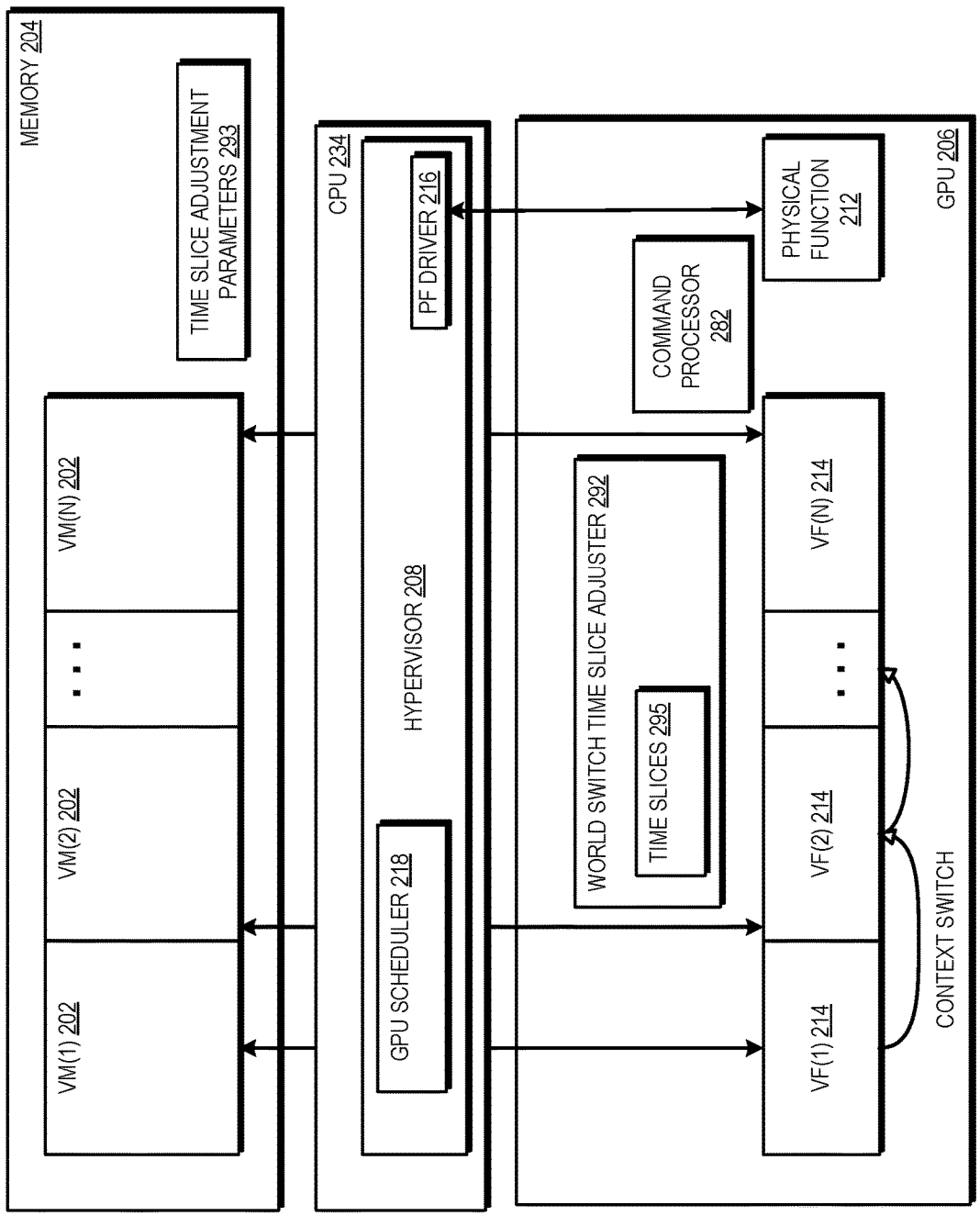
FIG. 2 is a diagram illustrating world switches between virtual functions in accordance with some embodiments.
Figure 3:
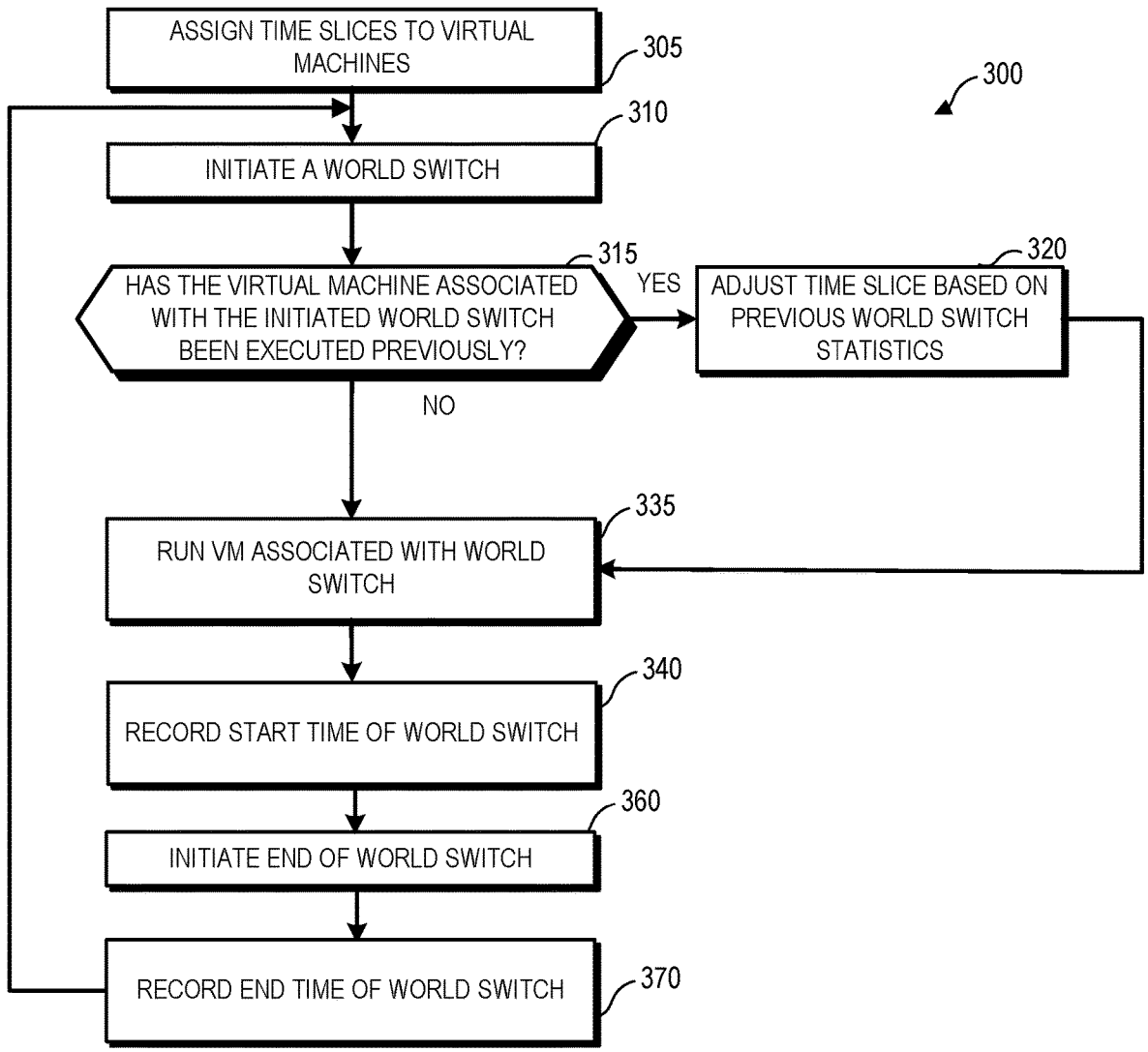
FIG. 3 is a flow diagram illustrating an example method for performing adaptive world switching in accordance with some embodiments.

FIGS. 1-3 illustrate systems and techniques configured to performing adaptive world switching. The system uses time slice adjustment parameters related to world switches that occur between, for example, virtual machines (VMs) to adapt the amount of time allocated for each world switch. The amount of time allocated for each world switch is adaptable, thereby making each world switch an adaptable world. When, for example, world switching occurs between virtual machines, the additional load caused by the world switch causes processing to take additional time to complete, which often increases the amount of time used by the virtual machine during the world switch. In order to mitigate the delay, the system records time slice adjustment parameters, such as, for example, both a start time and a completion time taken to perform each world switch. The time slice adjustment parameters include statistical parameters, such as, for example, the number of virtual machines that have been executed, the identification of the virtual machines have been executed, when the virtual machines were executed, and the duration of execution each virtual machine (e.g., the start time and end time of each world). In one embodiment, the world's current runtime time slice is adjusted based on the time slice adjustment parameters collected from the prior run of the same world. In one embodiment, when the world switch exceeds the desired time slice, the runtime of the subsequent virtual machine is adjusted by, for example, reducing the time slice associated with the subsequent virtual machine. The system is able to adapt the execution times of the worlds to drive the system towards a more acceptable quality of service (QoS). In addition, the system is able to inform the user of the system when a particular VM or program repeatedly displays certain behavior, such as, for example, a world switch taking more or less time than expected. The notice to the user serves, for example, as an indication that the programs being executed using the guest virtual machine are intrusive and the user should optimize the corresponding programs to avoid being penalized in the form of a delay in world switching.

FIG. 1 is a block diagram of a processing system 100 for hosting virtual machines and virtual functions in accordance with some embodiments. The processing system 100, which, in some embodiments, is considered a host system, includes multiple virtual machines (VMs) 102 that are configured in memory 104. Resources from physical devices of the host system are shared among the VMs 102. The resources can include, for example, a graphics processor resource from GPU 106, a central processing unit resource from a CPU 134, a memory resource from memory, a network interface resource from network interface controller, or the like. The VMs 102 use the resources for performing operations on various data (e.g., video data, image data, textual data, audio data, display data, peripheral device data, etc.).

The processing system 100 also includes a hypervisor 108 that is a software program running on, for example, CPU 134, that controls memory 104 and manages instances of VMs 102. The hypervisor 108 includes software components for managing hardware resources and software components for virtualizing or emulating physical devices to provide virtual devices, such as virtual disks, virtual processors, virtual network interfaces, or a virtual GPU as further described herein for each virtual machine 102. The hypervisor 108 is also known as a virtualization manager or virtual machine manager (VMM). The hypervisor 108 controls interactions between the VMs 102 and the various physical hardware devices, such as the GPU 106. In one embodiment, each virtual machine 102 is an abstraction of a physical computer system and includes an operating system (OS), such as Microsoft Windows® and applications, which are referred to as the guest OS and guest applications, respectively, wherein the term "guest" indicates, for example, that the OS and applications are software entities that reside within the VMs.

The VMs 102 are generally instanced, meaning that a separate instance is created for each of the VMs 102. Although three virtual machines (e.g., VM(1), VM(2), and VM(N)) are shown, one of ordinary skill in the art will recognize that a host system supports any number N of virtual machines. As illustrated, the hypervisor 108 provides three virtual machines VM(1), VM(2), and VM(N), with each of the guest virtual machines 102 providing a virtual environment wherein guest system software resides and operates. The guest system software comprises application software and VF device drivers 110 (VF drivers 110), typically under the control of a guest OS.

In various virtualization environments, single-root input/output virtualization (SR-IOV) specifications allow for a single Peripheral Component Interconnect Express (PCIe) device (e.g., GPU 106) to appear as multiple separate PCIe devices to the system. In some embodiments, a physical PCIe device (such as GPU 106) having SR-IOV capabilities is configured to appear as multiple functions. The term "function" as used herein refers to a device with access controlled by, for example, a PCIe bus. SR-IOV operates using the concepts of physical functions (PF) and virtual functions (VFs), where physical functions are full-featured functions associated with the PCIe device. A virtual function (VF) is a function on a PCIe device that supports SR-IOV. The VF is associated with the PF, and represents a virtualized instance of the PCIe device. Each VF has its own PCI configuration space. Further, each VF also shares one or more physical resources on the PCIe device with the PF and other VFs.

In the example embodiment of FIG. 1, the SR-IOV specification enables the sharing of graphics processing unit 106 among the virtual machines 102. The GPU 106 is a PCIe device having a physical function 112. The virtual functions 114 are derived from the physical function 112 of the graphics processing unit 106, thereby mapping a single physical device (e.g., the graphics processing unit 106) to a plurality of virtual functions 114 that are shared with the guest virtual machines 102. In some embodiments, the hypervisor 108 maps (e.g., assigns) the virtual functions 114 to the guest virtual machines 102. In another embodiment, the hypervisor 108 assigns to the hardware either virtual functions 114 or the PF driver 116. In some embodiments, VF(1) 114 is mapped to VM(1) 102, VF(2) 114 is mapped to VM(2) 102, and so forth. The virtual functions 114 appear to the OS of their respective virtual machines 102 in the same manner as a physical GPU would appear to an operating system, and thus, the virtual machines 102 use the virtual functions 114 as though they were a hardware device.

Driver support for the virtual functions 114 is provided using VF drivers 110 installed in the guest OS of the virtual machines 102. As used herein, a device driver is a computer program based component that configures the system and acts as a translator between a physical device and the applications or operating systems that use the device. A device driver typically accepts generic high-level commands and breaks them into a series of low-level, device-specific commands as required by the device being driven. The VF drivers 110 perform the same role as a typical device driver except that the VF drivers 110 configure the host system to provide translation between the virtual functions 114 that provide hardware emulation and the guest OS/application software running on the VMs 102. Each VF driver 110 comprises a set of instructions for directly interacting with a corresponding VF 114 of the GPU 106.

Physical function 112 is contacted via PF driver 116, which is implemented on a program running on, for example, CPU 134. In various embodiments, the PF driver 116 manages functions for the GPU 106 and is responsible for configuring shared resources. The PF driver 116 contains all traditional driver functionalities to provide access to the resources of the GPU 106. Further, in some embodiments, the PF driver 116 is called to perform operations that impact the entire GPU 106 device. Any device specific operations that globally affect all VMs 102 are only accepted from the PF driver 116. Generally, the VFs 114 only have the ability to send and receive data, and the ability to perform resets on themselves. That is, each individual VF 114 is able to only reset itself, and not the entire GPU 106. In another embodiment, the VFs 114 are not permitted to reset themselves. Instead, the PF 112 or PF driver 116 performs the VF reset on behalf of the VFs 114.

In operation, in various embodiments, GPU scheduler 118 of hypervisor 108 manages time slices for the VMs 102 that share the GPU 106. That is, GPU scheduler 118 is configured for managing time slices by tracking the time slices, stopping work on the GPU 106 when a time slice for a VM 102 that is being executed has expired, and starting work for the next VM 102 having the subsequent time slice. In conjunction with GPU scheduler 118, world switch time slice adjuster 192 is configured to manage the storage and analysis of time slice adjustment parameters related to world switches between VMs 102 in order to allow for adaptive world switching to occur based on adjusting the time slices associated with the VMs, as described further below with reference to FIGS. 2-3.

FIG. 2 is a diagram illustrating adaptive world switches between virtual functions in accordance with some embodiments. FIG. 2 shows a hardware-based VM system 200 similar to the hardware based VM system previously described in FIG. 1. The system 200 includes a plurality of VMs 202 that are configured in memory 204 on a host system. Resources from physical devices (e.g., GPU 206) of the host system are shared with the VMs 202. The system 200 also includes a hypervisor 208 that is configured in memory 204 and manages instances of VMs 202. The hypervisor 208 controls interactions between the VMs 202 and the various physical hardware devices, such as the GPU 206. Although two virtual machines (e.g., VM(1) and VM(2)) are shown, one of ordinary skill in the art will recognize that a host system supports any number N of virtual machines. As illustrated, the hypervisor 208 provides two virtual machines VM(1) and VM(2), with each of the guest VMs 202 providing a virtual environment wherein guest system software resides and operates. The guest system software comprises application software and VF device drivers 210, typically under the control of a guest OS running on the VMs 202.

The GPU 206 is a PCIe device having a physical function 212. The virtual functions 214 are derived from the physical function 212 of the graphics processing unit 206, thereby mapping a single physical device (e.g., the graphics processing unit 206) to a plurality of virtual functions 214 that is shared with the guest virtual machines 202. In some embodiments, the hypervisor 208 maps (e.g., assigns) the virtual functions 214 to the guest virtual machines 202. As stated previously, the virtual functions 214 appear to the OS of their respective virtual machines 202 in the same manner as a physical GPU would appear to an operating system, and thus, the virtual machines 202 use the virtual functions 214 as though they were a hardware device.

Driver support for the virtual functions 214 is provided using VF drivers 210 installed in the guest OS of the virtual machines 202. The VF drivers 210 perform the same role as a typical device driver except that it configures the host system to provide translation between the virtual functions 214 that provide hardware emulation and the guest OS/application software running on the VMs 202. Each VF driver 210 comprises a set of instructions for directly interacting with a corresponding VF 214 of the GPU 206.

Similar to the physical function 112 in FIG. 1, physical function 212 is contacted via PF driver 216, which is implemented at the hypervisor 208 in some embodiments. In other embodiments, the PF driver 216 is implemented at a privileged host VM and is run by the hypervisor 208. In some embodiments, the PF driver 216 manages functions for the GPU 206 and is responsible for configuring shared resources. In some embodiments, the PF driver 216 contains all traditional driver functionalities to provide access to the resources of the GPU 206. Further, in some embodiments, the PF driver 216 is also able to be called to perform operations that impact the entire GPU 206 device.

In various embodiments, GPU scheduler 218 is configured in the hypervisor 208 to manage the allocation of GPU resources to perform the operations of the virtual functions 214. In one embodiment, the GPU scheduler 218 manages and provisions GPU bandwidth of the GPU 206 by time-slicing between the VMs 202. In one embodiment, the GPU PF driver 216 is used to manage and provision GPU bandwidth of the GPU 206. In SR-IOV virtualization as discussed herein, the VFs 214 get their time slices from the GPU scheduler 218.

In operation, to initiate work for a particular time slice associated with a particular VM, such as for example, VM(1) 202 or VM(2) 202, GPU scheduler 218 causes the command processor 282 to fetch commands for processing from memory 106 (i.e., fetch microcode associated with the particular virtual machine). Command processor 282 then causes GPU 206 to execute the commands associated with the virtual machine. During execution of the virtual machine, world switch time slice adjuster 292 collects time slice adjustment parameters related to the executed virtual machine. For example, world switch time slice adjuster 292 attains time slice adjustment parameters related to the current and previously executed virtual machines that occurred during world switches. The time slice adjustment parameters include statistical parameters, such as, for example, the number of virtual machines that have been executed, the identification of the virtual machines have been executed, when the virtual machines were executed, and the duration of execution each virtual machine (e.g., the start time and end time of each world switch). In one embodiment, for example, world switch time slice adjuster 292 records the start time and end time of the world switch associated with the executed virtual machine. Thus, at the start of execution, world switch time slice adjuster 292 records the start time of the VM being executed, e.g., VM(1) 202 and stores the recorded start time in time slice adjustment parameters 293 in memory 204 associated with GPU 206.

When the time slice associated with the virtual machine that is currently being executed located in, for example, memory 204, has expired or an interrupt instruction is received by the GPU 206, GPU scheduler 218 initiates a world switch to, for example, VM(2) 202. Upon initiation of the world switch (in addition to world switch time slice adjuster 292 recording the end time of the virtual machine whose execution as ended as a result of the world switch, e.g., VM(1) 202), world switch time slice adjuster 292 performs an analysis of the collected time slice adjustment parameters in order to adaptively or selectively adjust time slices associated with the world. For example, in one embodiment, world switch time slice adjuster 292 computes the average time slice for the virtual machine being switched to by dividing the summation of the time slices for the virtual machine currently being executed (i.e., the virtual machine whose instructions are currently being executed) by the number of times the current virtual machine has been executed. In one embodiment, the current time slice is replaced (i.e., substituted) by the average time slice attained as a result of the analysis, thereby reducing the likelihood of the virtual machine exceeding the duration of the time slice.

In one embodiment, as part of the analysis, world switch time slice adjuster 292 determines whether the virtual machine associated with the initiated world switch has been previously executed, which is accomplished by tracking the virtual machines that have been executed by GPU 206. In order to track the virtual machines that have been executed using GPU 206, world switch time slice adjuster 292 stores a list of the virtual machines (e.g., VMs 202) that have been executed using GPU 206 in memory 204, along with the associated start and end times of each executed virtual machine.

As a result of continuously collecting the time slice adjustment parameters, world switch time slice adjuster 292 is able to determine the actual time of the time slice that is used by the current virtual machine, subtract the actual time of the time slice from the allotted time slice, and determine the amount of time that the current virtual machine has deviated from its given allotted time slice. World switch time slice adjuster 292 is then able adjust the time slice allotted for the next world that utilizes the same virtual machine. Thus, when, for example, the world switch time slice adjuster 292 determines that the virtual machine associated with the world switch has been previously executed, world switch time slice adjuster 292 adjusts the current time slice (i.e., the time slice associated with the virtual machine currently being executed) based on the results of an analysis of the time slice adjustment parameters associated with the executed virtual machine. Thereby, making the world switching adaptive and decreasing the lag time of the world switch by continuously adapting the allotted time slice based on most recent actual time slices used by the virtual machine.

After the world switch time slice adjuster 292 selectively adjusts the time slices, the virtual machine associated with the world switch continues being executed, where both the start time and the end time of the world switch are recorded in memory 204. The virtualization process then continues to continuously adapt the world switches in order to improve the QoS experience for the user of the computer system as described above and depicted in FIG. 3.

FIG. 3 is a flow diagram illustrating an example method 300 for performing adaptive world switching in accordance with some embodiments. Although the operations of FIG. 3 are described with respect to the system of FIGS. 1-2, it should be appreciated, the method 300, performed by any like system, with steps as illustrated or any other feasible order, falls within the scope of the present disclosure.

At block 305, GPU scheduler 218 assigns or allocates time slices to virtual machines 202. At block 310, based on, for example, a request from a virtual machine (e.g., VM 202(1) or VM 202(2)) from virtual machines 202 or an interrupt request, GPU scheduler 218 initiates a world switch (also called a context switch). At block 315, world switch time slice adjuster 292 determines whether the virtual machine associated with the world switch (e.g., VM 202(1) or VM 202(2)) has been executed previously.

At block 320, when the world switch time slice adjuster 292 determines that the virtual machine associated with the world switch has been executed previously, world switch time slice adjuster 292 adjusts the current time slice (i.e., the time slice associated with the virtual machine currently being executed) based on the results of an analysis of the time slice adjustment parameters associated with the previously executed virtual machine. Method 300 then proceeds from block 320 to block 335, where the virtual machine associated with the world switch is executed.

At block 340, the start time of the world switch is recorded into memory 204. At block 360, the end of world switch is initiated by GPU scheduler 218 when, for example, the end of the associated time slice occurs or an interrupt instruction is received by GPU 206. At block 370, the world switch time slice adjuster 292 records the end time of the world switch. The method 300 then continues to block 310.

In some embodiments, the apparatus and techniques described above are implemented in a system including one or more integrated circuit (IC) devices (also referred to as integrated circuit packages or microchips), such as those described above with reference to FIGS. 1-3. In some embodiments, electronic design automation (EDA) and computer aided design (CAD) software tools are used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, in some embodiments, the code representative of one or more phases of the design or fabrication of an IC device is stored in and accessed from the same computer readable storage medium or a different computer readable storage medium.

In some embodiments, a computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. In some embodiments, the computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. In some embodiments, the executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device are not required, and that one or more further activities are performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that cause any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above can be altered or modified and all such variations are considered within the scope of the disclosed subject matter. Accordingly, the protection sought herein is as set forth in the claims below.

What is claimed is:

1. A method, comprising:
allocating a plurality of time slices to a plurality of virtual machines;
initiating a world switch to a virtual machine of the plurality of virtual machines; and
responsive to initiating the world switch, selectively adjusting a time slice associated with the virtual machine based on one or more time slice adjustment parameters related to an execution time of at least one of the plurality of virtual machines.

2. The method of claim 1, wherein:
selectively adjusting the time slice associated with the virtual machine includes determining whether a previous execution of the virtual machine of the plurality of virtual machines executed prior to the world switch exceeded an allocated time slice.

3. The method of claim 2, wherein:
when the previous execution of the virtual machine of the plurality of virtual machines deviates from the allocated time slice, adjusting the time slice associated with the virtual machine by a time slice adjustment amount.

4. The method of claim 3, wherein:
the time slice adjustment amount is equivalent to an amount of time previous runs of the virtual machine of the plurality of virtual machines deviates from the allocated time slice.

5. The method of claim 1, wherein:
the one or more time slice adjustment parameters are attained by:
recording a start time of the world switch; and
recording an end time of the world switch.

6. The method of claim 5, further comprising:
generating an actual time slice time of the virtual machine; and
generating a time slice deviation.

7. The method of claim 6, wherein:
generating the actual time slice time of the virtual machine includes taking a difference between the end time of the world switch and the start time of the world switch; and generating the time slice deviation includes taking a difference between the actual time slice time and the time slice associated with the virtual machine.

8. The method of claim 6, further comprising:
adjusting the time slice associated with the virtual machine by the time slice deviation.

9. The method of claim 6, wherein:
a graphical processing unit (GPU) scheduler is used to adjust the time slice associated with the virtual machine.

10. An apparatus, comprising:
a plurality of virtual machines, the plurality of virtual machines being allocated a plurality of time slices for virtualization;
a hypervisor coupled to the plurality of virtual machines, the hypervisor initiating a world switch to a virtual machine of the plurality of virtual machines; and
a graphical processing unit (GPU) coupled to the hypervisor, the GPU selectively adjusting a time slice associated with the virtual machine responsive to the hypervisor initiating the world switch and based on one or more time slice adjustment parameters related to an execution time of at least one of the plurality of virtual machines.

11. The apparatus of claim 10, wherein:
selectively adjusting the time slice associated with the virtual machine includes a determination as to whether a previous execution of the virtual machine of the plurality of virtual machines executed prior to the world switch has deviated from an allocated time slice.

12. The apparatus of claim 11, wherein:
when the previous execution of the virtual machine of the plurality of virtual machines deviates from the allocated time slice, the time slice associated with the virtual machine is adjusted by a time slice adjustment amount.

13. The apparatus of claim 12, wherein:
the time slice adjustment amount is approximately equivalent to an amount of time the previous execution of the virtual machine of the plurality of virtual machines deviates from the allocated time slice.

14. The apparatus of claim 10, wherein:
the one or more time slice adjustment parameters include a start time of the world switch and an end time of the world switch.

15. The apparatus of claim 14, further comprises:
a world switch time slice adjuster, the world switch time slice adjuster generating:
an actual time slice time of the virtual machine; and
a time slice deviation.

16. The apparatus of claim 15, wherein:
the world switch time slice adjuster generates the actual time slice time of the virtual machine by taking a difference between the end time of the world switch and the start time of the world switch and generates the time slice deviation by taking a difference between the actual time slice time and the time slice associated with the virtual machine.

17. The apparatus of claim 16, wherein:
the world switch time slice adjuster adjusts the time slice associated with the virtual machine by the time slice deviation.

18. A method of performing adaptive world switching, comprising:
allocating a plurality of time slices to a plurality of virtual machines, the plurality of virtual machines including a first virtual machine and a second virtual machine;
initiating a world switch from the first virtual machine to the second virtual machine; and
responsive to initiating the world switch, selectively adjusting a time slice associated with the second virtual machine based on an analysis of one or more time slice adjustment parameters related to an execution time of at least one of the plurality of virtual machines.

19. The method of claim 18, wherein:
selectively adjusting the time slice associated with the second virtual machine includes determining whether a previous execution of the second virtual machine of the plurality of virtual machines executed prior to the world switch has deviates from an allocated time slice.

20. The method of claim 19, further comprising:
when the previous execution of the second virtual machine exceeds the allocated time slice, adjusting the time slice associated with the second virtual machine by a time slice adjustment amount.

\* \* \* \* \*